United States Patent [19]

Chun et al.

[11] 4,280,221
[45] Jul. 21, 1981

[54] DIGITAL DATA COMMUNICATION SYSTEM

[75] Inventors: Randall K. B. Chun, Renton; Donn E. Larsen, Bellevue, both of Wash.

[73] Assignee: The Boeing Company, Seattle, Wash.

[21] Appl. No.: 44,287

[22] Filed: May 31, 1979

[51] Int. Cl.³ .......................... H04L 3/00; H04B 3/36
[52] U.S. Cl. .......................................... 375/17; 375/55
[58] Field of Search ...................... 375/17, 18, 20, 23, 375/36, 55, 56, 110, 113; 178/70 R

[56] References Cited

U.S. PATENT DOCUMENTS

| Re. 27,810 | 11/1973 | Buehrle | 375/23 |
|---|---|---|---|
| 3,165,584 | 1/1965 | Thornton et al. | 375/55 |
| 3,361,978 | 1/1968 | Fiorini | 375/55 |
| 3,609,755 | 9/1971 | Fenyves | 375/17 |
| 3,631,463 | 12/1971 | Murphy | 375/20 |
| 3,671,671 | 6/1972 | Watanabe . | |
| 3,755,628 | 8/1973 | Games et al. . | |
| 3,781,873 | 12/1973 | Nussbaumer | 375/18 |
| 3,979,732 | 9/1976 | Hepworth et al. | 375/17 |
| 3,980,825 | 9/1976 | Morrien | 375/55 |
| 3,980,898 | 9/1976 | Priel . | |
| 4,002,931 | 1/1977 | Tsang et al. . | |
| 4,039,960 | 8/1977 | Clark . | |
| 4,078,159 | 3/1978 | Lender et al. | 375/17 |
| 4,083,005 | 4/1978 | Looschen | 375/17 |
| 4,097,859 | 6/1978 | Looschen | 375/17 |
| 4,110,697 | 8/1978 | Wilcox . | |
| 4,128,775 | 12/1978 | Frederiksen et al. . | |

FOREIGN PATENT DOCUMENTS 960726 11/1949 France .
1537557 12/1978 United Kingdom .

OTHER PUBLICATIONS

"An Introduction to Local Area Networks", Clark et al., Proc. IEEE, vol. 66, No. 11, Nov. 1978, pp. 1497-1517.
"Data Transmission with SN55107 Series", Texas Instruments, TTL, MOS, Linears, Opto. App'n Reports, 1971, pp. 200-206.
"Predistorting Transmission Line Driver", Widmer, IBM Tech. Discl. Bull., vol. 18, No. 3, Aug. 1975, pp. 706-709.
"Mark 33 Digital Informaton Transfer System", published Jun. 1, 1978 by Aeronautical Radio, Inc.

*Primary Examiner*—Thomas A. Robinson
*Attorney, Agent, or Firm*—David G. Pursel; Robert L. Gullette

[57] ABSTRACT

A digital data communication system including a data source and a source interface, a digital data bus, for transferring encoded information from the data source to one or more receivers, each having a receiver interface. The source interface is adaptable for controlling the rise and fall times of the signals on the bus at a plurality of frequencies. It is directly coupled to the bus and terminates the bus in its characteristic impedance. The receiver interface operates at a plurality of frequencies and is directly coupled to the bus.

20 Claims, 17 Drawing Figures

DIGITAL DATA COMMUNICATION SYSTEM

BACKGROUND OF THE INVENTION

This invention relates to communication systems and, more particularly, to digital data communication systems. One application of the invention illustrated and described herein is an aircraft avionics system; however, the invention may be used in other applications and environments.

Commercial aircraft digital avionics systems typically are made up of multiple system elements such as inertial navigation system elements, autopilot system elements or electronic engine control system elements. Digital data is transferred over a digital data bus from each system element that acts as a source of data to one or more receiver system elements or data sinks that require the data over a digital data bus. Each system element is composed of either a data source or a receiver, as the case may be, and an interface acting between it and the data bus. Typically, one data source serves multiple receivers and, since the receivers do not also act as data sources, the data transfer via the data bus is uni-directional from a data source to one or more receivers.

Since the system elements typically operate at different data transfer rates, different interfaces are required, depending upon the data rate at which the associated data source or receiver operates. For example, an interface that is designed for use with a data source which operates at a low data rate generally is not suited for use with a data source that operates at a higher data rate. The source interface, or transmitter, controls the rise and fall times of the digital signals applied to the bus in order to minimize the electromagnetic interference radiated from the bus at that data rate. At the low data rate, the interface provides a relatively long rise time for the data transmitted on the bus. However, when operating at the higher data rate, the long rise time can mask succeeding bits and cause erroneous data to be transmitted. Likewise, an interface that is designed for use with a receiver which operates at a low data rate is generally not suitable for use with a receiver that operates at a higher data rate. For example, one of the functions of a receiver interface is to indicate to the receiver when the data transmission begins and ends. The signal chosen to indicate the presence of transmitted data must so indicate for a period of at least beyond the end of the last bit period received in order to avoid missing a data bit. When operating at a low data rate, the interface extends this signal for a predetermined period of time. However, when reception is at a higher data rate, the signal extension tends to overlap the start of the first bit period of a subsequent transmission.

The next generation commercial airplane will be required to accommodate new sensors and provide compatible interfacing systems, controls and instruments and may use approximately 100 data transfer busses per ship set. Until this invention, many different digital data transmission standards, using different word labels, formats and electrical characteristics have been required. In addition, previous digital avionics systems did not require data transmission frequencies of 100 Kilobits per second (KBPS). Due to the new generation of digital avionics subsystems, a 100 KBPS data transmission frequency will be needed to support new sensors, controls and instruments. Examples of subsystems which require 100 KBPS data rates are new compass displays and electronic attitude direction indicators (EADI) which utilize CRT displays.

Therefore, it is an object of this invention to provide a digital data communication system capable of fulfilling the needs of future commercial aircraft avionics systems, in which information must be transferred via a digital data bus from a data source to one or more receivers in an economical and efficient manner.

Another object of this invention is to provide a digital data communication system having a source interface responsive to digital source data for encoding and transmitting it in digital signals on a digital data bus, and a receiver interface responsive to the encoded digital signals for decoding them and providing binary data representative of the digital source data.

A further related object of this invention is to provide a source interface adaptable for controlling the rise and fall times of the encoded digital signals on the data bus for a plurality of data rates.

Still another related object of this invention is to provide a receiver interface adaptable for receiving the encoded signals from the bus for a plurality of data rates and decoding the signals into digital data.

SUMMARY OF THE INVENTION

This invention accomplishes these and other objects by providing a digital data communication system which transmits binary information from a data source to one, two or more receivers along a common bus in an appropriate digital data format. The format of the transmitted data is preferably differential bipolar return-to-zero (RZ). The data source and each receiver include interface circuits which respectively encode and decode the digital data. The source interface is operable at more than one data rate or frequency, and is adjustable for controlling the rise and fall times of the signals on the data bus. The source interface preferably is directly coupled to the bus and terminates the bus in its characteristic impedance. Similarly, the receiver interface is operative at more than one data rate or frequency, and is also directly coupled to the bus. The range of frequencies over which the interfaces will operate include a high data rate of 100 kilobits per second and a low data rate of 12 to 14.5 kilobits per second.

With this construction, the same source interface circuit may be used with all data sources having corresponding output data formats. Likewise, the same receiver interface circuit may be used with all receivers having corresponding input data formats. As a consequence, a single bus may carry the data flow from a given data source to all receivers served thereby. As will now be appreciated, this invention provides a digital data communication system which affords interchangeability, design efficiency and overall economies which surpass and are unparalleled by other digital data communications systems heretofore used in aircraft digital avionics systems. Additionally, this invention satisfies or exceeds the minimum standards for the transfer of digital data between avionics systems elements set forth in ARINC Specification 429-1, entitled "Mark 33 Digital Information Transfer System (DITS)", published by Aeronautical Radio, Inc. (hereinafter referred to as the "ARINC 429 Specification").

The ARINC 429 Specification enables compatible interfacing of two different pieces of equipment that may be built by two or more different manufacturers of avionics equipment. Adherence to the standard is voluntary; however, if the manufacturer wishes to sell products which are plug compatible in the application area encompassed by the standard, it behooves him to comply if at all feasible. Previous standards have usually adopted the electrical characteristics of a pre-existing interface, especially if the usage of such electrical characteristics was widespread when the standard was drafted. Similarly, the ARINC 429 Specification is a consensus given to one set of interface specifications, rather than an optimal, more general solution to data communications interface problems.

The present invention employs a hybrid source interface which performs the functions of a serial NRZ to RZ data, clock and sync logic encoder and power line driver; and a hybrid receiver interface which is coupled to the data bus and outputs serial NRZ data, clock and sync signals. Only the basic transmitting and receiving functions are implemented in the source interface and receiver interface hybrids because they are intended for use as universal interface components and the utility of extra functions is application dependent. As a result, users have more flexibility to optimize their interface design and the further advantage of reduced cost for a basic device usually results in a lower system cost.

Two choices of circuit packaging to meet the above requirements are possible. They are large scale integration (LSI) or hybrid microcircuits. The LSI solution yields lower recurring production costs at the expense of higher non-recurring development costs, less power dissipation tolerance, and more troublesome amplifier trimming prospects. Here, hybrid packaging is preferred in terms of total quantities involved, power dissipation, unit price and technological compatibility. For production quantities of less than 10,000 units, a hybrid is more economical than an LSI package. One of the advantages of a hybrid microcircuit design is that, like discrete component circuits, optimum components (in chip form) can be combined to achieve a given circuit design goal. In order to optimize power, speed and versatile interface compatibility, a mix of CMOS (logic) and BIPOLAR (linear) technology is preferred. Hybrid manufacturing easily lends itself to mixing CMOS and bipolar technologies, whereas LSI manufacturing does not. This flexibility does not yet exist with LSI circuits due to various manufacturing processes required for different types of optimum components. Besides miniaturization, other advantages of a hybrid device are gained in reducing printed circuit board (PCB) area, reducing cabinet sizes, shipping costs, purchasing and inventory costs. Three packaging configurations would be desirable; a single source interface package, a single receiver interface package and a dual receiver interface package.

This invention provides a source interface and a receiver interface which meets or exceeds the requirements of the ARINC 429 Specification. The source and receiver interfaces are embodied in thick-film hybrid microelectronics circuits and provide the circuit functions necessary to interface a new generation of avionics systems or subsystems to a data bus for digital information transfer from one location to another via line drivers, twisted shielded pair transmission lines and line receivers in accordance with the ARINC 429 Specification. However, their design is flexible and universal in nature so as not to preclude their usage in similar applications. The hybridized interfaces represent an efficient compromise in minimizing cost, power and physical package size while optimizing speed, reliability and universal utilization as versatile interface components. Hybride technology has enabled an efficient mix of low power CMOS and high speed bipolar-FET technology for optimum performance. Further, hybrid microelectronics packaging has reduced the physical package size by 4:1 for the source interface and 6:1 for the receiver interface. Further advantages of these hybridized interfaces are: elimination of the manufacturing problems associated with LSI circuits and the multitude of components required for discrete component designs as means of interfacing to an ARINC 429 Specification type data bus, and elimination of the proliferation of similar but incompatible interface designs.

According to further aspects of one preferred embodiment of this invention, the source interface and receiver interface respectively provide the driving and receiving means for a direct coupled, binary, serial digital data transmission channel using a shielded, twisted pair wire cable as the transmission medium. The source interface includes a binary encoder and a three-state differential output transmission line driver circuit which is directly coupled to the transmission line and provides a balanced, differential, three-state, risetime controlled and source terminated output signal. Non-return to zero (NRZ) data, clock and sync signals are encoded by the source interface into a self-clocking three level code known as bipolar return-to-zero (RZ) modulation. A balanced, direct coupled, differential input receiver circuit which detects said 3-state signal is used as the transmission line receiver to receive and convert the bipolar return-to-zero (BPRZ) modulated signal into a return to zero (RZ) modulated signal which is then decoded to regenerate the original data, clock and sync signals in an NRZ format. No transmission line termination is provided by the receiver interface; however, the source interface's output impedance is matched to the transmission line's characteristic impedance and this provides the means for a source terminated system. The data transmission channel operates in a transmission mode defined as a "simplex distribution bus" which affords uni-directional, non-reversible data flow from a single source interface to the receiver (s). A maximum of 20 receivers may be connected to one data bus in an ARINC 429 Specification system; however, source and receiver interfaces may be used in other applications with more than 20 receivers, different data transmission frequencies, cable parameters, etc.

An information or data source could be a computer, digitized transducer output or any other device which emits a serial stream of bits at the rate of one bit every $t_B$ seconds. The information rate of the system is then defined as $F = 1/t_B$ bits per second. The source and receiver interfaces described herein are designed to operate at a high frequency ($F_H$) of 100,000 bits per second or a low frequency ($F_L$) range of 12,000 to 14,500 bits per second. Although information rates $F_H$ and $F_L$ are ARINC 429 Specifications characteristics, the interfaces may be used in other applications requiring different information rates. In addition to a data signal, the information source should also output a clock and a sync signal. These signals are fed to a logic encoder which performs logic operations therein to produce two binary data streams for controlling a line driver as internal source logic signals. The line drive converts these signals to required transmission line voltages and currents. Low impedance outputs of the line drivers are connected to bus termination resistors which provide an impedance match between the output impedance of the source interface and the transmission line's characteristic impedance so as to allow the source interface outputs to absorb and prevent multiple line reflections. These differential output signals are transferred by the two differential signal wires of the twisted and shielded pair data bus constituting the transmission line to the inputs of the differential receiver. The receiver includes an input protection circuit which prevents damage to the receiver due to transmission line transients or any overvoltage condition present at the receiver inputs. Signals arriving at the receiver's inputs are sensed by a differential amplifier which has an appropriate input impedance to prevent excessive line loading and enable high common mode rejection (CMR) to reject common mode noise signals. The binary output of this amplifier is the voltage difference between the two input signal wires. Decision is made on the logic state of the detector output by comparing it to hysteresis type threshold levels in logic '1' and logic '0' detectors. Hysteresis type thresholds improve the receiver's noise immunity by rejecting transmission line noise. A data, clock and sync decoder perform logic operations on the binary bit streams obtained to decode and reproduce the data, clock and sync signals which appear at the information source. From the decoder, the recovered binary data passes to a receiver which is the destination for the information source data. The receiver may be a computer, actuator or any device using the source information. The frequency mode of the receiver may be controlled by selecting a low frequency ($F_L$) or high frequency ($F_H$) of operation. Additionally, the rise and fall times of the source interface output signals may be controlled for operation in the $F_L$ or $F_H$ modes.

These and other features, objects, and advantages of the present invention will become apparent from the detailed description and claims to follow, taken in conjunction with the accompanying drawings in which like parts bear like reference numerals.

DETAILED DESCRIPTION OF THE DRAWINGS

Figure 1:
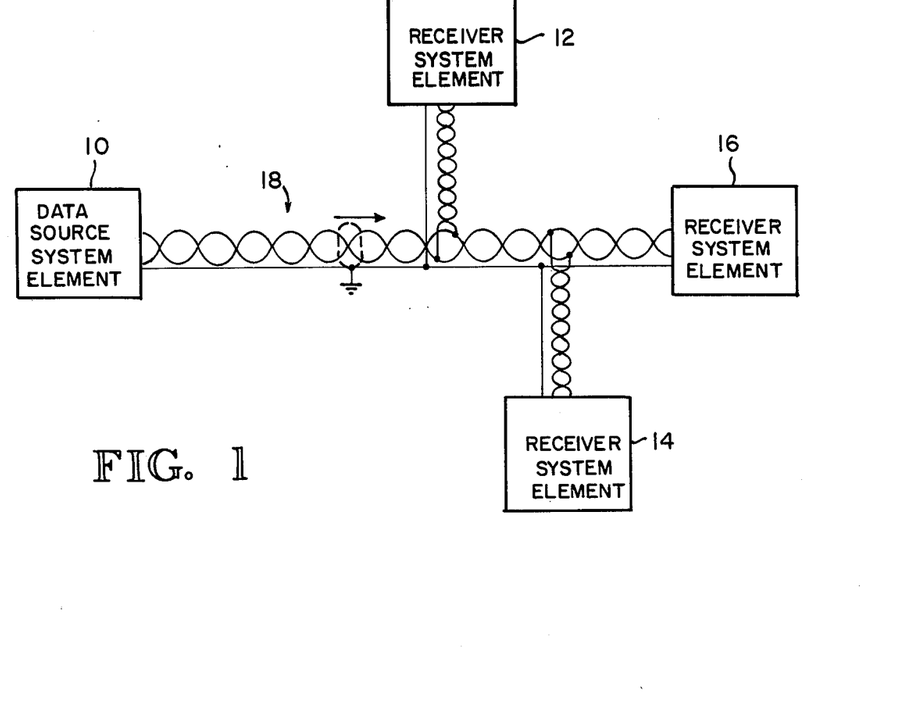
FIG. 1 is a block diagram of the digital data communication system of this invention.
Figure 2:
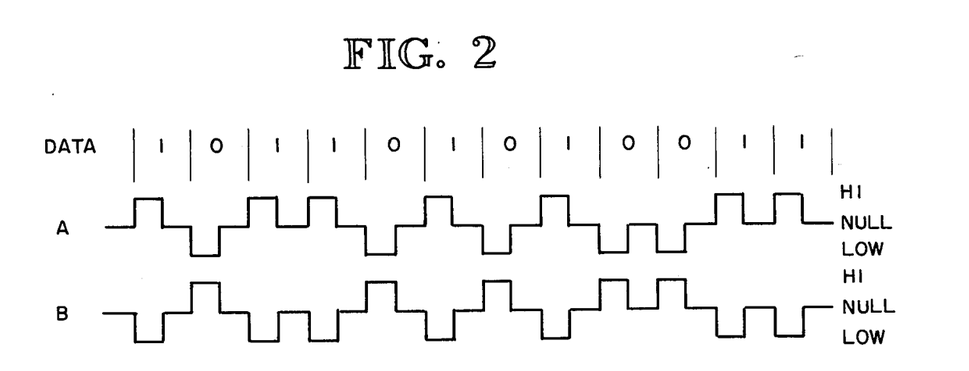
FIG. 2 is a timing diagram of the differential bipolar return-to-zero signals in the FIG. 1 system.

Referring to the digital data communication system of this invention as illustrated in FIG. 1, a data source system element 10 is connected to a plurality of receiver system elements 12, 14 and 16 by a conventional shielded twisted pair transmission line or data bus 18. Data transfer via line 18 is uni-directional in the direction indicated by the arrow in FIG. 1. In the example illustrated, information transmitted by the data source system element 10 is presented to line 18 as a differential bipolar return-to-zero (RZ) signal illustrated in FIG. 2. This signal appears as signal A on one wire of line 18 and signal B on the other wire thereof. Signal A has an amplitude equal to the amplitude of signal B but opposite in polarity. Bipolar RZ signals involve three distinct states, or voltage levels; HIGH, NULL and LOW. A logical one data bit is defined as a "HI" state during the first half of the bit interval returning to the "NULL" state during the second half of the same bit interval. A logical zero data bit is defined as a "LO" state during the first half of the bit interval returning to the "NULL" state during the second half of the bit interval. It is a characteric of RZ coding that the signal always returns to the null state during the second half of each transmitted bit period.

Figure 3:
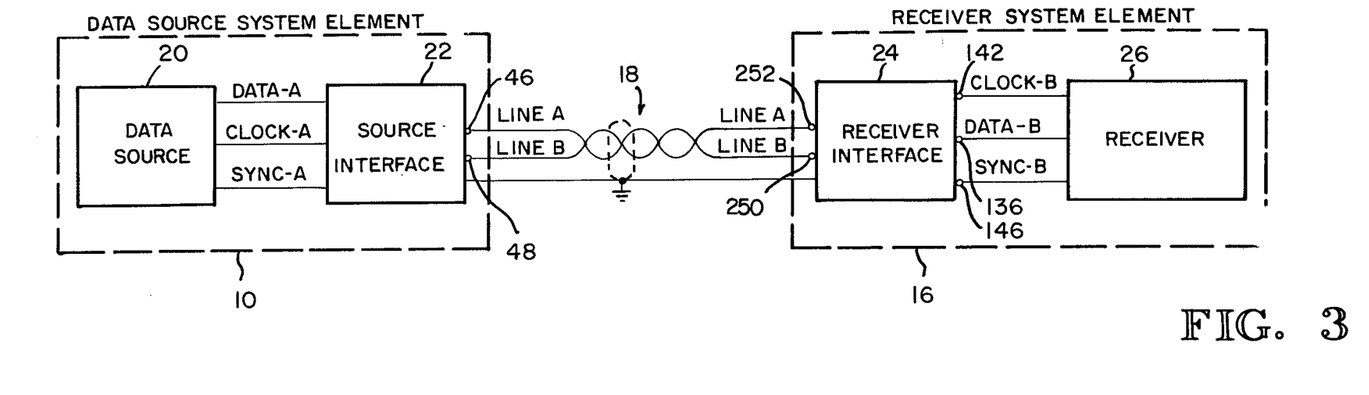
FIG. 3 is a block diagram of the FIG. 1 system in greater detail.

The communication system of FIG. 1 is shown in more detail in FIG. 3 wherein the data source system element includes data source 20 and source interface 22. The receiver system element includes receiver interface 24 and receiver 26. Source interface 22 receives binary DATA-A, CLOCK-A, and SYNC-A signals, which are of the serial binary nonreturn-to-zero (NRZ) type, from the data source. Source interface 22 encodes and transmits the data in differential bipolar RZ format on the transmission line to receiver interface 24. The receiver interface decodes the data and provides CLOCK-B, DATA-B, and SYNC-B signals in an NRZ format to receiver 26. The source and receiver interfaces are directly coupled to transmission line 18 as distinguished from capacitive or transformer coupling. When information is continuously transmitted in differential bipolar RZ format, a residual voltage can build up on the transmission line if transformer or capacitive coupling is used. This is because the energy in each bit does not always average out to zero and if, for example, a long series of logical ones is transmitted, then the NULL level rises towards the HIGH voltage level. The tendency of the NULL state to float is avoided by directly coupling the interface to the transmission line. However, other coupling techniques can be used to achieve the same result such as using optical isolation to couple the interfaces to the bus.

Figure 4:
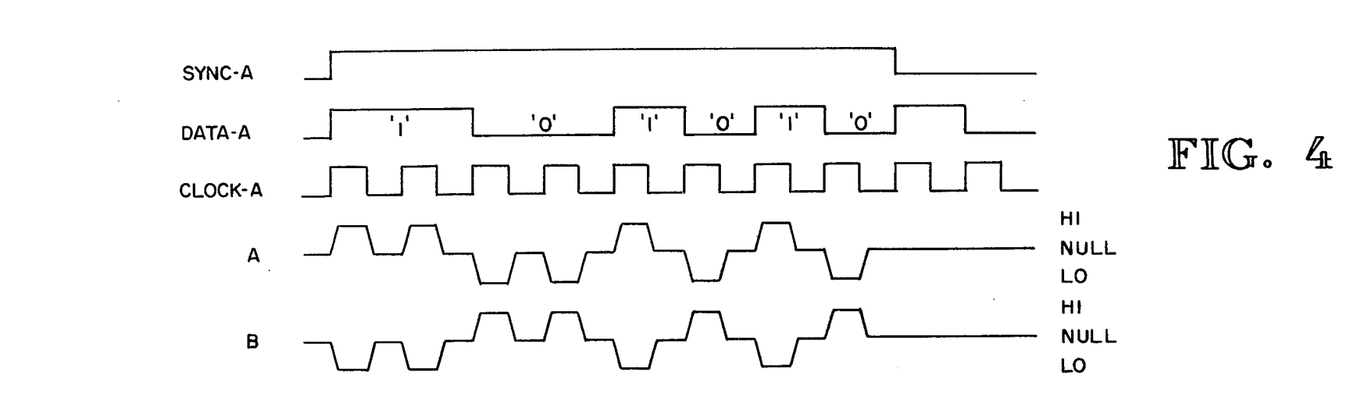
FIG. 4 is a timing diagram of the binary signals in the data source system element of FIG. 3.

The DATA-A, CLOCK-A and SYNC-A signals and the signals on line A and line B are timed as illustrated in FIG. 4. When binary data is to be transmitted from a data source system element, SYNC-A goes to a logical one state. SYNC-A acts as a transmit enable when it is in the logical one state and a transmit disable when it is in the logical zero state. The Line A and Line B waveforms depicted as graphs A and B respectively, in FIG. 4 represent the signals presented to the transmission line by the source interface in response to the signals from the data source. When the DATA-A signal is a logical one and the CLOCK-A signal is a logical one, the signal on line A is also a logical one and the signal on line B is a logical zero. Similarly, when the DATA-A signal is a logical zero and the CLOCK-A signal is a logical one the signal on line A is a logical zero and the signal on line B is a logical one. The differential bipolar signals on lines A and B are equal in amplitude but opposite in polarity.

Source interface 22 will be described in further detail by reference to FIG. 5. It includes encoding logic 28, line driver A 30, line driver B 32 and line termination impedances 34 and 36. The signals provided to the input ports of the source interface correspond to signals DATA-A, CLOCK-A and SYNC-A of FIG. 4 and the corresponding waveforms are shown for reference in FIG. 6 respectively. Encoding logic 28 transforms NRZ DATA-A into inverted RZ binary data. Encoding logic 28 generates at its output on line 40 a waveform depicted as waveform I in FIG. 6. Waveform I is a logical zero whenever SYNC-A is a logical one, DATA-A is a logical zero and CLOCK-A is a logical one. Similarly, encoding logic 28 generates at its output on line 38 a signal as shown by waveform II in FIG. 6. Waveform II is a logical zero whenever SYNC-A is a logical one, DATA-A is a logical one and CLOCK-A goes to a logical one. The outputs of encoding logic 28 are fed into line driver 30 which produces at its output line 42 a signal corresponding to waveform A of FIG. 6. The output from driver 30 is fed to driver 32 which produces at its output line 44 a signal corresponding to waveform B of FIG. 6. Output line 42 from driver 30 is finally fed to impedance matching resistor 34 which in turn reproduces at its output 46 the pulse pattern corresponding to waveform A of FIG. 6. Output 44 of driver 32 is fed into impedance matching resistor 36 which in turn reproduces at its output 48 the signal corresponding to waveform B of FIG. 6.

Figure 5:
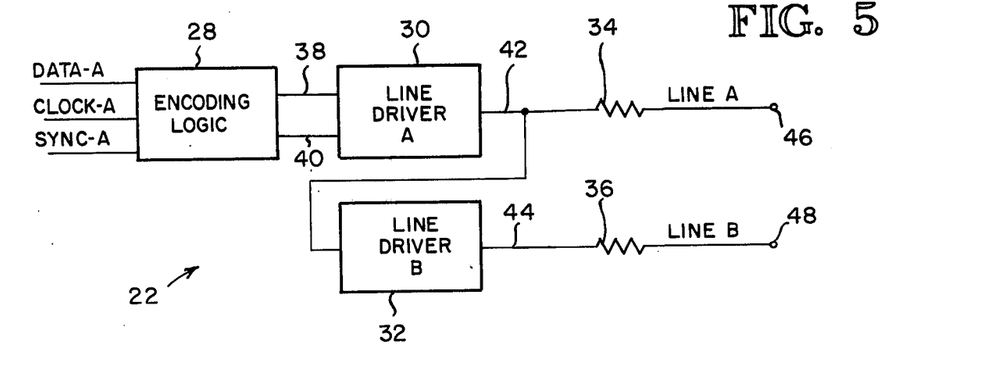
FIG. 5 is a block diagram of the FIG. 3 source interface.
Figure 7:
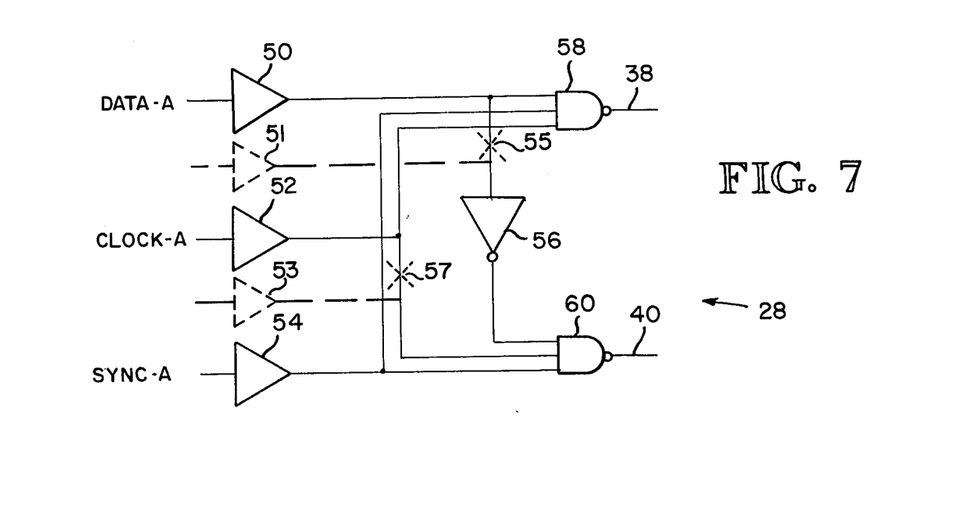
FIG. 7 is a circuit diagram of the encoding logic of the FIG. 5 source interface.

Reference is now directed to FIG. 7 which illustrates a preferred circuit for the FIG. 5 encoding logic 28. In the example illustrated, encoding logic 28 comprises a plurality of non-inverting buffers 50, 52 and 54. The dashed gates 51 and 53 and their associated connections will be described later. In this example, the non-inverting buffers are selected CMOS level shifting devices so that the DATA-A, CLOCK-A and SYNC-A signals from the data source can vary in voltage from between 3.5 volts to 15 volts in the logical 1 state. This level shifting character of CMOS devices permits the power supply in the data source to operate at any voltage level between 5 and 15 volts. Thus, the information source generating the data, clock and sync may be transistor transistor logic (TTL), Integrated Injection Logic (I²L), CMOS or NMOS logic which allows flexible interfacing to the most standard logic families. The implementation of encoding logic 28 has provisions for receipt of 3 signals from data source 20: DATA-A, CLOCK-A, and SYNC-A. The DATA-A signal is fed into buffer 50 and its output is connected to NAND gate 58 and inverter 56. The CLOCK-A signal is fed into buffer 52 and its output is connected to NAND gate 58 and NAND gate 60. The SYNC-A signal is fed into buffer 54 and its output is connected to NAND gate 58 and NAND gate 60.

Figure 6:
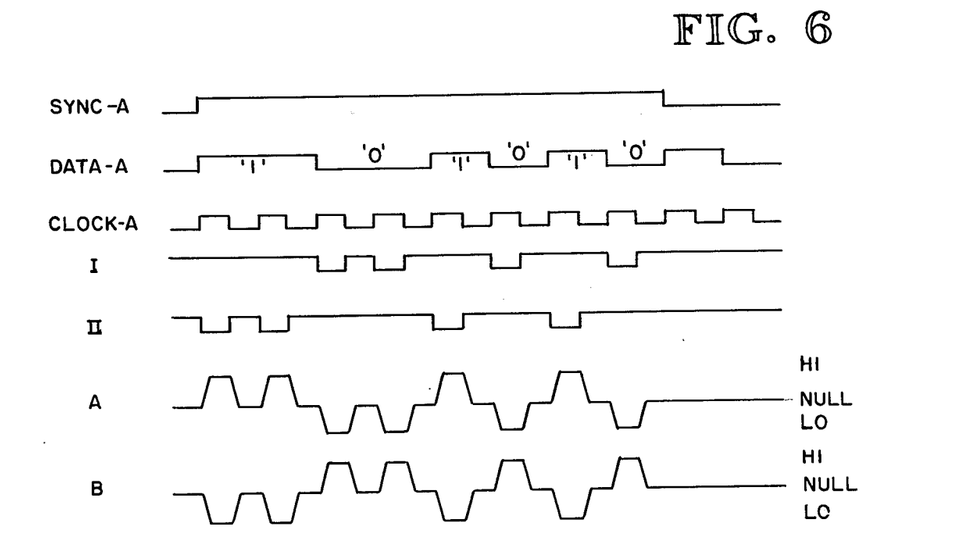
FIG. 6 is a timing diagram of the binary signals in the FIG. 5 source interface.

The operation of the FIG. 5 encoding logic circuit will now be described with reference to the waveforms depicted in FIG. 6. Assume that the data source has data to transmit and the SYNC-A a signal is at a logical one. In the logical one state, the SYNC-A signal acts as an enable for gates 58 and 60. If the DATA-A signal is at a logical one, then a logical one will be presented to gate 58 and inverter 56. The output of inverter 56 will present a logical zero to gate 60 which will force output line 40 of gate 60 to remain in the logical one state. When CLOCK-A goes to a logical one state, a logical one will be presented to both gate 58 and gate 60. Output line 38 of gate 58 will go to a logical zero. When CLOCK-A returns to a logical zero, a logical zero will be presented to gates 58 and 60. Output 38 of gate 58 will return to the logical one state. Thus, whenever DATA-A is a logical one, output 40 will remain in the logical one state and output 38 will have the same waveform as CLOCK-A but inverted.

Assume now that the data source is going to transmit a logical zero. DATA-A is a logical zero so the output of buffer 50 presents a logical zero to inverter 56 whose output presents a logical one to gate 60. The logical zero on the output of buffer 50 is also presented to gate 58 and forces output 38 to remain in the logical one state. When CLOCK-A goes to a logical one, buffer 52 presents a logical one to gate 58 and gate 60, and output 40 goes to a logical zero in response thereto. Output 38 remains in a logical one state because a logical zero is still presented to its input from buffer 50. When CLOCK-A goes to a logical zero state, the output of buffer 52 is a logical zero and is presented to gate 58 and gate 60, and output 40 goes to a logical one in response thereto. Thus, when DATA-A is a logical zero, output 38 will remain in the logical one state and output 40 will have a waveform like CLOCK-A but inverted. The waveforms on outputs 40 and 38 are shown in FIG. 6 as Graphs I and II, respectively.

Figure 8:
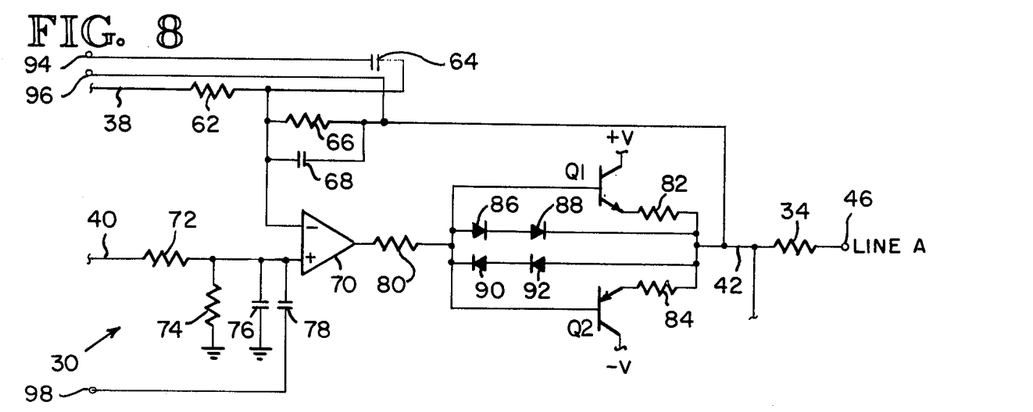
FIG. 8 is a circuit diagram of the line driver A of the FIG. 5 source interface.

Referring now to FIG. 8, a preferred circuit for the FIG. 5 line driver A (referenced 30) has inputs 38 and 40 and output 42. Input 38 to line driver 30 is the output from encoding logic gate 58 and is connected to resistor 62. The output of resistor 62 is connected to capacitor 64, resistor 66, capacitor 68 and the inverting input of operational amplifier 70. Input 40 is the output of encoding logic gate 60 and is connected to resistor 72. The output of resistor 72 is connected to resistor 74, capacitor 74, capacitor 78 and a non-inverting input of operational amplifier 70. The output of operational amplifier 70 is connected to current limiting resistor 80. The output of resistor 80 is connected to a current booster circuit comprising transistors Q1, Q2, resistors 82 and 84 and diodes 86, 88, 90, and 92. Output 42 of the current booster circuit is connected to resistor 66, capacitor 68, and impedance matching resistor 34. Output 46 of resistor 34 is connected to the transmission line.

When a logical zero is applied to line 38 and a logical one is applied to line 40 then the output of operational amplifier 70 goes to a logical one. Current flows through resistor 80 and into the base of transistor Q1 to turn it on. However, the base of Q2 is positive with respect to its emitter which turns it off. With transistor Q1 on, current flows from the positive power supply through resistor 82 into resistor 34 to terminal 46 where it is presented to the transmission line. When a logical one is applied to line 38 and a logical zero to line 40, the output of operational amplifier 70 is a logical zero. With a logical zero on the output of operational amplifier 70, the base of Q1 is at a logical zero causing Q1 to be turned off. The base of Q2 is also at a logical zero which turns Q2 on. With Q2 turned on, current flows from the transmission line into terminal 46, through resistors 34 and 84, through Q2 and into the negative power supply causing the voltage level on the transmission line to be pulled down to the value of the logical zero output state. Resistor 80 acts as a current limiting resistor and prevents oscillations from occurring on the output of operational amplifier 70. Resistor 82 limits the amount of current that can be sourced by transistor Q1 to the transmission line. Resistor 84 limits the amount of current that can be sunk by Q2 from the transmission line. In the event the transmission line should be shorted to ground, resistors 82 and 84 protect transistors Q1 and Q2 from conducting excessive currents.

Still referring to FIG. 8, the rise time of the pulse generated at output 46 is controlled by two RC networks in order to minimize the electromagnetic interference associated with pulses having fast rise times. The advantages of controlling rise and fall times on only one amplifier include using less parts, lowering manufacturing labor and parts costs, improved reliability and fewer external package pins and connections for rise time control. The first rise time control circuit is made up of resistor 66 and capacitor 68 and the second circuit is made up of resistor 74 and capacitor 76. In the preferred embodiment, the source interface operates at two data rates, a high data rate of 100 KBITS/SEC and a low data rate of 12 KBITS/SEC to 14.5 KBITS/SEC. The normally sharp rising edge of a pulse at terminal 46 is slowed down by the integrating effect of these two circuits when the source interface is operating at the high data rate. The circuit is adaptable for operation at the low data by jumpering these terminals. Terminal 98 is connected to ground which has the effect of paralleling capacitors 76 and 78, and terminal 94 is connected to terminal 96 which has the effect of paralleling capacitors 64 and 68. It is readily apparent that the source interface has universal application at any data rate by choosing the proper values of capacitors 64, 68, 76 and 78 to accommodate any rise time requirement that a system might have. Additionally, the rise and fall times are user selectable without requiring additional components.

Figure 9:
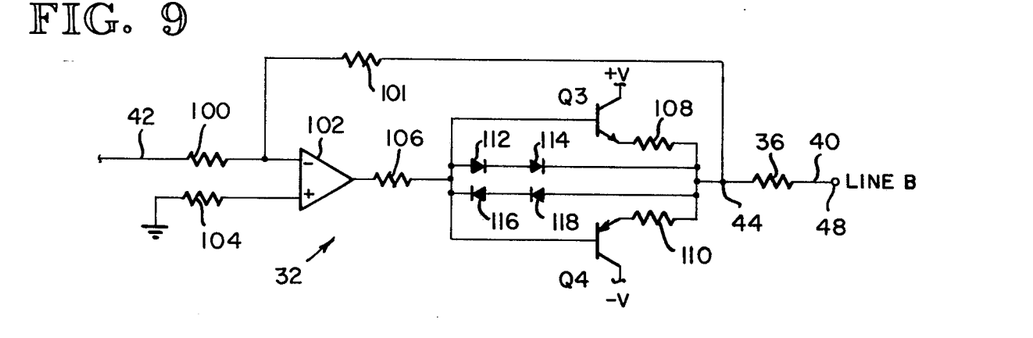
FIG. 9 is a circuit diagram of the line driver B of the FIG. 5 source interface.

Referring now to FIG. 9, a preferred circuit for the FIG. 5 line driver B (referenced 32) has an input 42 and output 44. Input 42 is driven from line driver 30 and is connected to resistor 100. The output of resistor 100 is connected to resistor 101 and the inverting input of operational amplifier 102. The non-inverting input of operational amplifier 102 is connected to resistor 104 which is grounded at its other terminal. The output of operational amplifier 102 is connected to resistor 106 which has its output connected to a second current booster circuit. This current booster circuit includes transistor Q3 and Q4, resistors 108 and 110, and diodes 112, 114, 116, and 118.

Line driver 32 is a unity gain inverting amplifier and produces a signal equal in amplitude to that presented to line A but opposite in polarity. If a logical zero signal is applied to input 42, then the output of operational amplifier 102 will be a logical one. Current will flow through resistor 106 and into the base of transistor Q3 and cause Q3 to turn on. The logical one presented to the base of transistor Q4 causes Q4 to turn off. Current will flow from the positive power supply through Q3, resistor 108 and impedance matching resistor 36 to output terminal 48. If a logical one signal is presented to input line 42, the output of operational amplifier 102 will be a logical zero. The logical zero is presented to the bases of transistors Q4 and Q3 causing transistor Q3 to turn off and Q4 to turn on. With transistor Q4 turned on, current can flow from the transmission line into terminal 48, through resistors 36 and 110, transistor Q4 and into the negative power supply. Thus, when the signal on line 42 is at a logical one, terminal 48 will be at a logical zero and when the signal on line 42 is at a logical zero terminal 48 will be at a logical one.

FIG. 3 illustrates a receiver system element comprising receiver interface 24 having input terminals 250 and 252 and output terminals 142, 136 and 146 which convey binary signals CLOCK-B, DATA-B and SYNC-B to the inputs of receiver 26. Receiver interface 24 is illustrated in block diagram form in FIG. 10. Input terminals 250 and 252 are connected to the transmission line to receive the differential bipolar RZ data transmitted by the data source system element. Output 120 of differential input signal amplifier 122 is connected to the inputs of ones detector 124 and zeros detector 126. Output 128 of the zeros detector is fed into data decoder 130 and clock decoder 134. Output 132 of the ones detector is fed into data decoder 130 and clock decoder 134. The output of the data decoder is connected to terminal 136 and provides a signal designated DATA-B. Output 138 of the clock decoder is fed into sync decoder 140 and is also connected to terminal 142 and provides a signal designated CLOCK-B. Sync decoder 140 has another input connected to terminal 144 and an output connected to terminal 146 which provides a signal designated SYNC-B.

Figure 10:
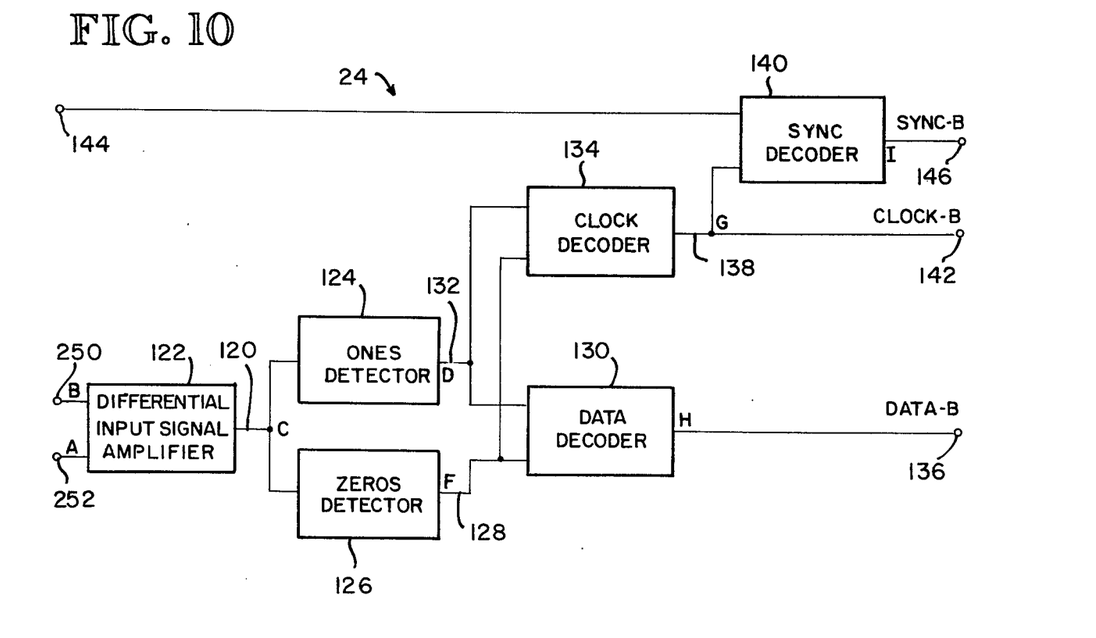
FIG. 10 is a block diagram of the FIG. 3 receiver interface.
Figure 11:
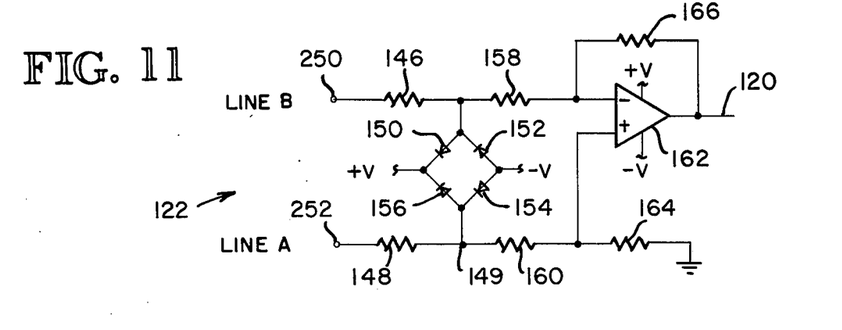
FIG. 11 is a circuit diagram of the differential input signal amplifier of the FIG. 10 receiver interface.

FIG. 11 depicts the circuit implementation of differential input signal amplifier 122 of FIG. 10. Referring to FIG. 11, the differential input signal amplifier has input terminals 250 and 252, which interface with the transmission line, connected to resistors 146 and 148 respectively. The output of resistor 146 is connected to the anode of diode 150, the cathode of diode 152 and resistor 158. The output of resistor 148 is connected to the cathode of diode 154, the anode of diode 156 and resistor 160. The anodes of diodes 152 and 154 are connected to the negative power supply and the cathodes of diodes 150 and 156 are connected to the positive power supply. The output of resistor 160 is fed into the non-inverting input of operational amplifier 162 and also into resistor 164 which has its output terminal connected to ground. The output of resistor 158 is connected to the inverting input of operational amplifier 162 and feedback resistor 166 which has its output connected to the output terminal of operational amplifier 162.

The diode bridge operates in conjunction with resistors 146, 148, 158, 160, and 164 to protect operational amplifier 162 from overvoltage transients on the transmission line. If a voltage is applied to terminal 252, then the voltage would be divided across resistor 148 and the combination of resistors 160 and 164. If the voltage level at node 149 is above the voltage level of the positive power supply by more than one diode drop, then diode 156 would conduct. The input of resistor 160 would therefore never see a voltage level greater than one diode drop above the positive power supply. Similarly, if the voltage applied to terminal 252 is a negative voltage, then the voltage would divide across resistor 148 and the combination of resistors 160 and 164. If the voltage level at node 148 is below the voltage level of the negative power supply by more than one diode drop then diode 154 would conduct. Therefore, the input to resistor 160 would never see a voltage level more negative than one diode drop below the negative power supply. Resistor 146 and 148 also limit the amount of current permitted to flow through the diode bridge whenever an overvoltage transient occurs on the transmission line.

Referring again to FIG. 11, operational amplifier 162 detects the differential voltage between terminals 252 and 250 and provides a bipolar return-to-zero signal on line 120. If a logical one is applied to terminal 252 and a logical zero is applied to terminal 250 then the output of operational amplifier 162 on line 120 is a logical one. Similarly, if a logical zero is placed on terminal 252 and a logical one on terminal 250 then the output of operational amplifier 162 on line 120 is a logical zero. The relationship between the input signals present at terminals 250 and 252 and the output signal produced on line 120 is depicted FIG. 12, wherein graph A corresponds to a waveform presented to terminal 252, graph B corresponds to a waveform presented to terminal 250 and graph C corresponds to the resulting signal presented on line 120.

Figure 13:
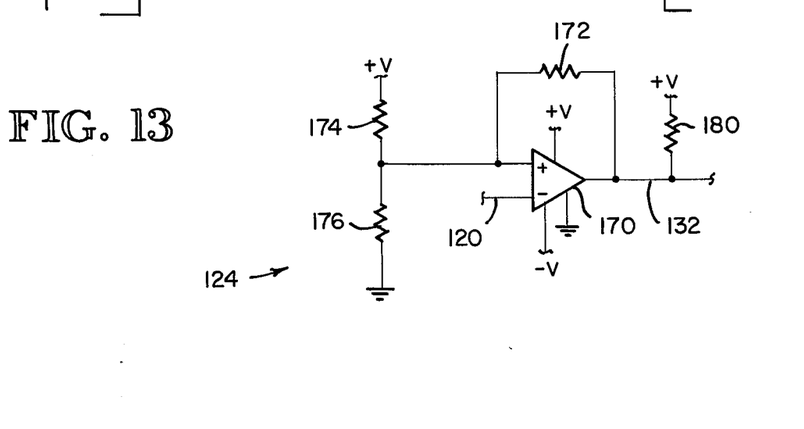
FIG. 13 is a circuit diagram of the FIG. 10 ones detector.

FIG. 13 illustrates the circuit implementation of ones detector 124 of FIG. 10. Line 120 is the inverting input to voltage comparator 170 and originates at output 120 of operational amplifier 162 shown in FIG. 11. The non-inverting input of voltage comparator 170 is connected to feedback resistor 172 and bias resistors 174 and 176. The other terminal of resistor 174 is connected to the positive power supply and the other terminal of resistor 176 is connected to ground. Output 132 of voltage comparator 170 is connected to the other terminal of feedback resistor 172 and also to pull-up resistor 180, which has its other terminal connected to the positive power supply. Resistor 172, 174 and 176 form a resistor network to set the detection threshold for a logical one.

Figure 12:
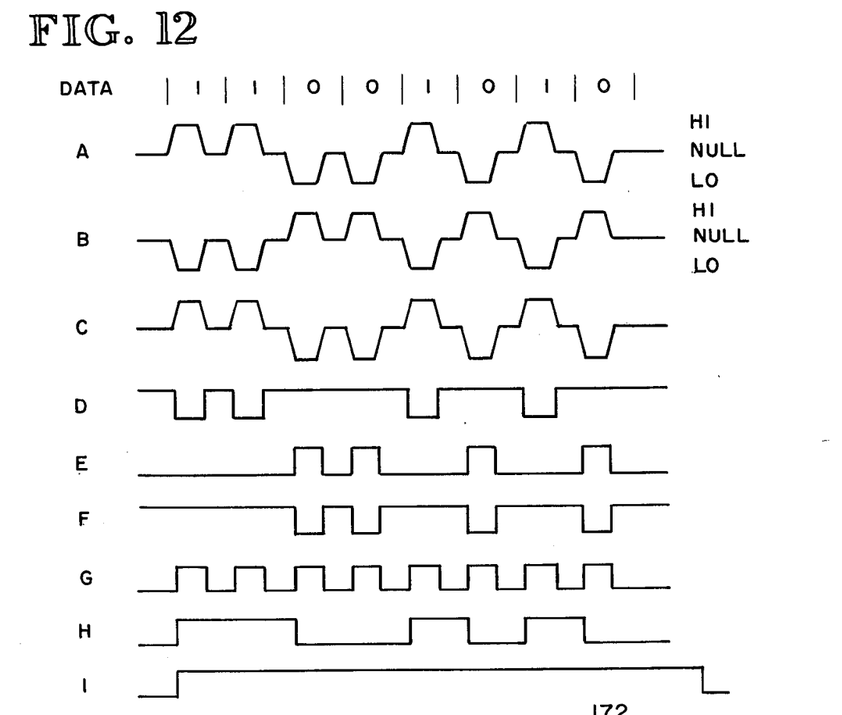
FIG. 12 is a timing diagram of the binary signals developed in the FIG. 10 receiver interface.

For illustrative purposes, graph C of FIG. 12 illustrates a waveform applied to line 120 which feeds the inverting input to voltage comparator 170, and graph D illustrates the waveform developed by voltage comparator 170 and applied to line 132. Thus, when a positive signal exceeding the logical one threshold is applied to line 120, the ones detector circuitry provides a logical zero on output line 132. When a negative signal is applied to line 120, output 132 remains in a logical one state. The output of the logic one detector goes to a logical zero only when line 120 receives a positive signal exceeding the logical one threshold.

Figure 14:
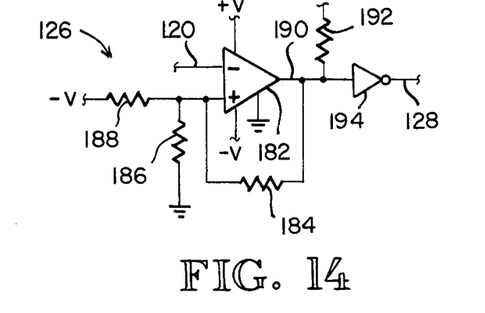
FIG. 14 is a circuit diagram of the FIG. 10 zeros detector.

FIG. 14 illustrates the circuit implementation of zero detector 126 of FIG. 10. Voltage comparator 182 is connected by line 120 at its inverting input to output 120 of operational amplifier 162 shown in FIG. 11. The non-inverting input is connected to feedback resistor 184, resistor 186, which has its other terminal connected to ground, and resistor 188 which has its other terminal connected to the negative power supply. Output 190 of voltage comparator 182 is connected to the other terminal of feedback resistor 184, one side of resistor 192, which has its other side connected to the positive power supply, and inverter 194 which has output terminal 128.

FIG. 12 depicts the relationship between the bipolar RZ waveform on line 120 of FIG. 14, which is referenced as a graph C, and the resulting waveforms on lines 190 and 128 which are referenced as graphs E and F, respectively. If a logical one or a NULL is applied to line 120, output 190 of voltage comparator 182 will remain at its steady state logic zero condition and output 128 of inverter 194 will remain a logical one. When a logical zero is applied to line 120 output 190 goes to a logical one and output 128 goes to a logical zero. Thus, output line 128 is usually in a logical one state and goes to the logical zero state only when the signal on line 120 goes to a logical zero.

Figure 15:
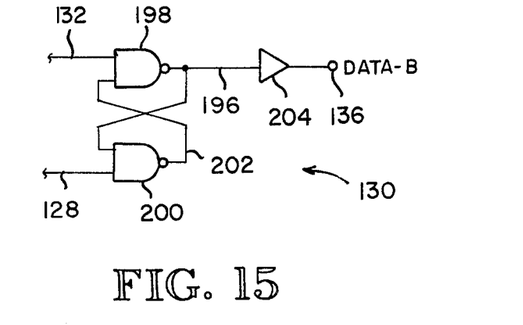
FIG. 15 is a circuit diagram of the FIG. 10 data decoder.

The circuit implementation of data decoder 130 of FIG. 10 is shown in FIG. 15. The data decoder is implemented from two NAND gates in an RS flip-flop configuration with a non-inverting buffer on the output. Normally inputs 132 and 128 will have logical ones applied to them as depicted by waveforms D and F, respectively, of FIG. 12. Input 132 is the set side of the RS flip-flop and input 128 is the reset side. If a logical zero from the ones detector is applied to line 132, output 196 of the RS flip-flop will go to a logical one as will output 136 of non-inverting buffer 204. The RS flip-flop will maintain this state until a logical zero is applied to line 128 from the zeros detector, causing output 196 of the RS flip-flop to go to a logical zero as does output 136 of non-inverting buffer 204. Now the RS flip-flop will maintain this state until a logic zero is applied to line 132 from the ones detector. Waveform H of FIG. 12 depicts the DATA-B output of the data decoder of FIG. 15. The output remains a logical one whenever a logical zero occurs on input line 132 (waveform D, FIG. 12), until a logical zero occurs on input line 128 (waveform F, FIG. 12). Similarly, the output remains a logical zero whenever a logical zero occurs on input line 128, until a logical zero occurs on input line 132.

Figure 16:
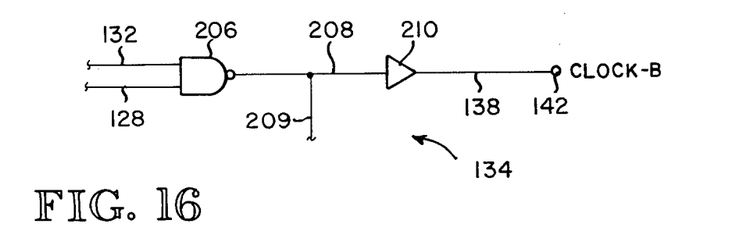
FIG. 16 is a circuit diagram of the FIG. 10 clock decoder.

Referring to FIG. 16, the circuit implementation of clock decoder 134 of FIG. 10 is illustrated. The signal on input 132 to NAND gate 206 is generated by the ones detector circuitry and is shown as graph D of FIG. 12. The signal on input 128 is generated by the zeros detector circuitry and is illustrated as graph F of FIG. 12. The logical NAND of these two signals appears on line 208 which is connected to non-inverting buffer 210. Output 138 of buffer 210 is illustrated as graph G in FIG. 12 and is designated the CLOCK-B signal. The CLOCK-B signal that appears at terminal 142 is a logical one whenever the output from the ones detector on line 132 is a logical zero or whenever the output from the zeros detector on line 128 is a logical zero; otherwise the CLOCK-B signal is a logical zero.

Figure 17:
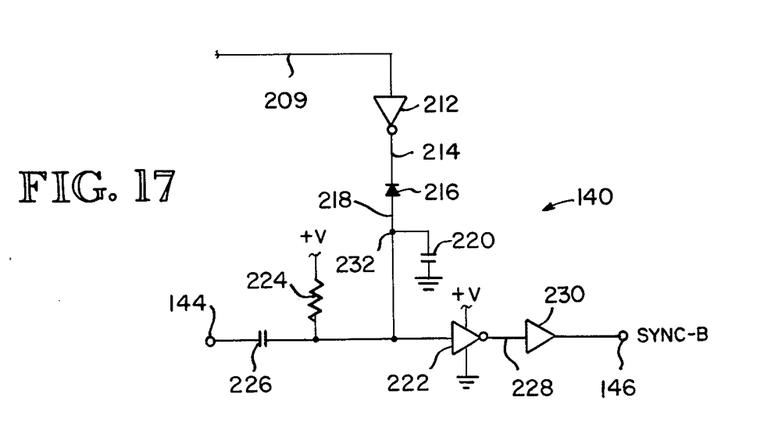
FIG. 17 is a circuit diagram of the FIG. 10 sync decoder.

The circuit implementation of sync decoder 140 of FIG. 10 is illustrated in FIG. 17. The sync decoder has input line 209, from the output of NAND gate 206 (FIG. 16), and input terminal 144 and output terminal 146. Input line 209 is connected to the input of inverter 212 which has its output 214 connected to the cathode of diode 216. The anode of diode 216 is connected by line 218 to one side of capacitor 220 which has its other side connected to ground, the input of Schmitt trigger 222, one side of pullup resistor 224, which has its other side connected to the positive power supply, and one side of capacitor 226 which has its other side connected to input terminal 144. Output 228 of Schmitt trigger 222 is connected to the input of non-inverting buffer 230 which has its output connected to output terminal 146 and provides a signal which is designated SYNC-B.

When the receiver interface is receiving data from the transmission line, the clock decoder continuously generates a clock pulse for each bit period, depicted by graph G of FIG. 12. These clock pulses are provided on line 209 to inverter 212 of FIG. 17. When the signal on line 209 is a logical one, then output 214 of the inverter goes to a logical zero and causes diode 216 to conduct.

With the diode forward biased, capacitor 220 is discharged through diode 216 and a logical zero appears on the input to Schmitt trigger 222. Output 228 of the Schmitt trigger goes to a logical one, causing the output of buffer 230 to be a logical one also. When the signal on line 209 returns to a logical zero, output 214 of inverter 212 goes to a logical one causing diode 216 to be reverse biased and it stops conducting. Capacitor 220 begins to charge from the positive power supply through resistor 224. If the receiver interface continues to receive data from the transmission line then another clock pulse will appear on line 209 and cause capacitor 220 to be discharge again through forward biased diode 216, and the input to Schmitt trigger 222 will never reach a logical one state. Under such a mode of operation, output 228 of the Schmitt trigger will remain in the logical one state while data is being received as depicted by waveform I of FIG. 12. When data is no longer received, line 209 will normally be at a logical zero causing output 214 of inverter 212 to be a logical one. Diode 216 is reverse biased and capacitor 220 will charge through resistor 224 up to a logical one. With a logical one applied to the input of Schmitt trigger 222, output 228 will go to a logical zero state and the SYNC-B signal at terminal 146 will also be in a zero state. The RC time constant of resistor 224 and capacitor 220 is such that the voltage level at the input to Schmitt trigger 222 will rise from a logical zero to a logical one if no clock pulses appear for approximately two successive bit periods. When the SYNC-B signal returns to a logical zero its signifies the end of the data reception.

The receiver interface will operate at whatever frequency data arrives on the transmission line. But it may be desirable to tailor the RC time constant to a fast and a slow data rate. To provide a proper RC time constant for a fast data rate terminal 144 is left open and the RC time constant is determined by the combination of resistor 224 and capacitor 220. If receiver operation is desired at a lower data rate then terminal 144 is connected to ground which effectively parallels capacitor 226 and capacitor 220. In this configuration the RC time constant is calculated as the product of the resistance 224 and the parallel combination of capacitors 220 and 226.

Although one preferred embodiment of the invention has been illustrated and described herein, variations will become apparent to one of ordinary skill in the art. For example, it will be appreciated that in its simplest form, the diode circuits of FIG. 8 and FIG. 9 provide short circuit current protection for the source interface by limiting the amount of current it can source if the transmission line is shorted to ground. However, in some applications a solid state active circuit may be preferred.

Furthermore, in some applications it may be preferable for the data source to provide only two binary signals in the return-to-zero (RZ) format; a data ones signal and a data zeros signal. When a logical one occurs in the data one signal, it indicates that the data source is providing a logical one to the source interface. When a logical one occurs on the data zeros signal, it indicates that the data source is providing a logical zero to the source interface. The encoding logic of FIG. 7 is readily adaptable for accepting these RZ data signals.

For example, if the wires shown in FIG. 7 are cut at points 55 and 57, and gates 51 and 53, which are similar to gates 50, 52 and 54, are connected as shown by the dotted lines then the circuitry is configured to accept the ones data and zeros data signals described above. The ones data signal is applied to the input of gate 50, the zeros data signal is applied to the input of gate 53, the input to gate 51 is connected to ground, and the inputs to gates 52 and 54 are connected to the positive power supply of the data source. When a logical one is applied to the input of gate 50, the output of gate 38 will be a logical zero. When a logical one is applied to gate 53, the output of gate 60 will be a logical zero. Thus, the encoding logic is readily adaptable for accepting two binary signals in the return-to-zero format from the data source and transforming them into signals compatible with the circuitry following the encoding logic. Accordingly, the invention is not to be limited to the specific embodiment illustrated and described herein, and the true scope and spirit of the invention are to be determined by reference to the appended claims.

The embodiments of the invention in which an exclusive property or privilege is claimed are defined as follows:

1. A digital data communication system for transferring digital information from a source to one or more receivers, comprising: source interface means for receiving digital signals generated by the source and producing encoded digital signals while controlling their rise and fall times on the basis of two source generated signal frequencies; receiver interface means for decoding said encoded digital signals into digital signals representative of said source generated digital signals for presentation to a receiver; and bus means operatively associated with said source interface means and said receiver interface means for transferring said encoded digital signals from said source interface means to said receiver interface means.

2. The system of claim 1, including a plurality of receiver interface means operatively associated with said bus means at spaced apart locations for decoding said encoded digital signals into signals representative of the source generated signals for presentation to respectively associated receivers.

3. The system of claims 1 or 2, wherein said source interface means includes means for shifting voltage level of the source generated signals.

4. The system of claims 1 or 2, wherein said source interface means include impedance matching means for terminating said bus means in its characteristic impedance.

5. The system of claims 1 or 2, wherein said source interface means and said receiver interface means are directly coupled to said bus means.

6. The system of claims 1 or 2, wherein said source interface means include encoding means for receiving digital signals from the source and encoding said signals, first line driver means for receiving said encoded signals and providing a first encoded digital signal for presentation to said bus means, second line driver means for receiving said first encoded digital signal and converting it to a second encoded digital signal opposite in polarity to said first signal for presentation to said bus means along with said first signal to produce said encoded digital signals in a differential bipolar return-to-zero format.

7. The system of claim 6, wherein said encoding means include means for receiving and encoding a binary data signal, a binary clock signal and a binary sync signal.

8. The system of claim 7, wherein said receiver interface means include differential input signal amplifier means for receiving said encoded digital signals and converting them into encoded bipolar signals indicative of the presence of logical ones and logical zeros, ones detector means responsive to said encoded bipolar signals for producing a ones signal indicative of the presence of a logical one, zeros detector means responsive to said encoded bipolar signal for producing a zeros signal indicative of the presence of a logical zero, data decoder means responsive to said ones signal and said zeros signal for producing a binary data signal for presentation to the receiver, clock decoder means responsive to said ones signal and said zeros signal for producing a binary clock signal for presentation to the receiver, and sync decoder means responsive to said binary clock signal and an external control signal for producing a binary sync signal for presentation to the receiver, whereby said data signal, clock signal and sync signal are representative of the source generated signals.

9. The system of claim 8, wherein said receiver interface means further include means for presenting a predetermined binary information signal to a receiver commencing upon beginning of transfer of said encoded digital signals and persisting for a time period extending beyond the termination of transfer of said encoded digital signals and related to the frequency thereof.

10. The system of claim 9, wherein said receiver interface means include means for selecting said time period.

11. The system of claim 6, wherein said bus means include a twisted shielded pair of electrical conductors and wherein said first and second encoded digital signals are respectively applied thereto.

12. A source interface circuit for presenting information to bus means, comprising: means for receiving digital signals generated by a source and producing encoded digital signals; means responsive to said encoded digital signals for controlling their rise and fall times on the basis of two source generated signal frequencies, and means for presenting said encoded digital signals to the bus means.

13. The circuit of claim 12, including means for shifting voltage level of the source generated signals.

14. The circuit of claim 12, including impedance matching means for terminating said bus means in its characteristic impedance.

15. The circuit of claim 12, wherein said interface means is directly coupled to said bus means.

16. The circuit of claim 12, including encoding means for receiving digital signals from the source and encoding said signals, first line driver means for receiving said encoded signals and providing a first encoded digital signal for presentation to said bus means, second line driver means for receiving said first encoded digital signal and converting it to a second encoded digital signal opposite in polarity to said first signal for presentation to said bus means along with said first signal to produce said encoded digital signals in a bipolar return-to-zero format.

17. The source interface means for claim 16 wherein said encoding means include means for receiving and encoding a binary data signal, a binary clock signal, and a binary sync signal.

18. A receiver interface circuit for receiving encoded digital signals representative of source generated digital signals transmitted via bus means, comprising: means for decoding said encoded digital signals into digital signals representative of the source generated signals for presentation to a receiver, differential input signal amplifier means for receiving said encoded digital signals and converting them into encoded bipolar signals indicative of the presence of logical ones and logical zeros, ones detector means responsive to said encoded bipolar signals for producing a ones signal indicative of the presence of a logical one, zeros detector means responsive to said encoded bipolar signal for producing a zeros signal indicative of the presence of a logical zero, data decoder means responsive to said ones signal and said zeros signal for producing a binary data signal for presentation to the receiver, clock decoder means responsive to said ones signal and said zeros signal for producing a binary clock signal for presentation to the receiver, and sync decoder means responsive to said binary clock signal and an external control signal for producing a binary sync signal for presentation to the receiver, whereby said data signal, clock signal and sync signal are representative of the source generated signals.

19. The circuit of claim 18, wherein said sync decoder means include means for presenting a predetermined binary information signal to a receiver commencing upon termination of transfer of said encoded digital signals and persisting for a time period extending beyond the termination of transfer of said encoded digital signals and related to the frequency thereof.

20. The circuit of claim 19, wherein said sync decoder means include means for selecting said time period.

* * * * *